(12) United States Patent
Larsen et al.

(10) Patent No.: US 7,454,977 B2
(45) Date of Patent: Nov. 25, 2008

(54) FORCE MEASURING SYSTEMS FOR DIGITAL PENS AND OTHER PRODUCTS

(75) Inventors: Glen C. Larsen, Issaquah, WA (US); Krishna Darbha, Bothell, WA (US); Michael W. Baseflug, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 224 days.

(21) Appl. No.: 11/057,371

(22) Filed: Feb. 15, 2005

(65) Prior Publication Data

US 2006/0181525 A1 Aug. 17, 2006

(51) Int. Cl.
G01B 7/16 (2006.01)
G01F 25/00 (2006.01)
G01L 1/00 (2006.01)

(52) U.S. Cl. ........................................... 73/763
(58) Field of Classification Search ............... 73/763, 73/862.69; 178/19.04; 345/179
See application file for complete search history.

(56) References Cited

U.S. PATENT DOCUMENTS

| 4,034,155 | A | * | 7/1977 | Muller et al. | 178/19.03 |
| 4,532,376 | A | * | 7/1985 | Rockwell | 178/19.01 |
| 5,290,972 | A | * | 3/1994 | Someya et al. | 178/19.04 |
| 5,438,275 | A | * | 8/1995 | Fado et al. | 324/662 |
| 5,565,632 | A | * | 10/1996 | Ogawa | 73/862.69 |
| 5,818,431 | A | * | 10/1998 | Oh et al. | 345/179 |
| 5,981,883 | A | * | 11/1999 | Shriver | 178/18.01 |
| 6,252,182 | B1 | * | 6/2001 | Lai | 178/19.04 |
| 6,727,439 | B2 | * | 4/2004 | Chao et al. | 178/19.01 |
| 6,755,584 | B2 | * | 6/2004 | O'Brien et al. | 401/117 |
| 6,882,340 | B2 | * | 4/2005 | Kanzaki et al. | 345/179 |
| 6,914,596 | B2 | * | 7/2005 | Liu et al. | 345/179 |
| 6,972,754 | B2 | * | 12/2005 | Zank | 345/179 |
| 6,985,138 | B2 | * | 1/2006 | Charlier | 345/179 |
| 7,202,862 | B1 | * | 4/2007 | Palay et al. | 345/179 |
| 2003/0106985 | A1 | * | 6/2003 | Fagin et al. | 250/208.1 |
| 2004/0179000 | A1 | * | 9/2004 | Fermgard et al. | 345/179 |
| 2005/0030297 | A1 | * | 2/2005 | Burstrom et al. | 345/179 |

* cited by examiner

*Primary Examiner*—Edward Lefkowitz
*Assistant Examiner*—Octavia Davis
(74) *Attorney, Agent, or Firm*—Birch, Stewart, Kolasch & Birch, LLP (57) ABSTRACT

Force measuring systems for electronic pens, styli, or other products may include structure for changing a direction or location of application of a force (e.g., a force transmitted via pen or stylus contact with a writing surface) from a first direction or location to a second direction or location. In this manner, a sensor portion of the force measuring system may be reoriented in a direction such that it is not normal to the direction of the force. This feature may help make electronic pens or styli (or other products) thinner and dimensioned more consistent with their non-electronic counterparts. Various structures for changing the direction or location of application of the force are described.

20 Claims, 7 Drawing Sheets

FORCE MEASURING SYSTEMS FOR DIGITAL PENS AND OTHER PRODUCTS

FIELD OF THE INVENTION

The present invention generally relates to systems and methods for measuring incident force, e.g., force measuring systems, including resistor systems adapted for measuring force, for electronic or digital pens, styli, or other products.

BACKGROUND

Typical computer systems, especially computer systems having graphical user interfaces ("GUIs"), are optimized for accepting user input from one or more discrete input devices, such as a keyboard for entering text and a pointing device, such as a mouse with one or more buttons, for operating and interacting with the user interface. An example of such a GUI is the user interface for the Windows® computer operating system (available from Microsoft Corporation of Redmond, Wash.). The ubiquitous keyboard and mouse interface provides for fast creation and modification of documents, spreadsheets, database fields, drawings, photos, web pages, emails, and the like.

Recently, however, pen-based computing systems, such as tablet personal computers ("tablet PCs"), personal digital assistants ("PDAs"), and the like, have been increasing in popularity. With pen-based computing systems, user input advantageously may be introduced as "electronic ink" and/or by mimicking writing using an electronic "pen" or stylus (e.g., mimicking writing with a pen or pencil on a piece of paper). Indeed, in at least some pen-based computing systems, all user input is capable of being entered and manipulated using an electronic pen input device, and the user interface is fully controllable using only the electronic pen.

Electronic or digital pens also are commercially available that enable users to write in conventional ink on a conventional piece of paper while, at the same time, electronically capturing and storing the handwritten input as electronic data (e.g., as electronic ink data, as image data, as recognized text data based on the ink input, etc.). Such electronic or digital pen products are commercially available from a variety of commercial sources.

The ability to electronically capture handwritten strokes can be beneficial in many ways. For example, the use of electronic or digital pens or styli provides familiar and well known input systems and methods that enable many users to quickly, easily, and conveniently input or generate electronic data that, in at least some instances, can be electronically captured, converted to machine-readable text, and/or stored.

In at least some instances, however, a person's handwriting can convey information in ways other than through the bare meaning of the strokes or words on the page. For example, the physical appearance of strokes on a page may convey information to the viewer. As more specific examples, the thickness or heaviness of a line, stroke, or word, optionally together with the underlying content of the writing in context, may provide information to the reader as to the writer's state of mind when making the writing (e.g., heavy or thick lines may indicate an agitated, excited, or angry state of mind, etc.), may indicate an intent to accent or stress certain information, etc.

In order to capture line thickness or other similar information when writing with electronic pens and/or in electronic ink, and to thereby enable better display or reproduction of the handwriting (e.g., as electronic ink or in printed form), some electronic pens or styli have been designed to include on-board writing force or pressure sensors in the form of resistor systems for measuring force. Conventional electronic pen or styli devices of this type typically have at least some portion of the force sensing system oriented normal to the direction of the incident writing force (i.e., perpendicular to the axis of the pen). This orientation, however, tends to increase the electronic pen's or stylus's cross-sectional area or width in the grip zone due to the footprint of the force sensing system, which tends to make the pen or stylus uncomfortably thick or difficult to use. Moreover, this conventional sensor structure must be properly aligned in the overall pen structure. Accordingly, it would be advantageous to provide an electronic pen or stylus that has dimensions more typical of a conventional ballpoint pen that is easy to build and mount, and that provides accurate and simple measurements of writing force or pressure.

SUMMARY

Aspects of the present invention relate to systems and methods for measuring incident force, e.g., sensors with resistors for measuring force and/or other force measuring systems for electronic or digital pens, styli, or other products. One aspect of this invention relates to force measuring systems capable of changing a direction or location of an incident force. Such force measuring systems may include: (a) a body member defining a chamber having an inlet opening and an outlet opening (wherein the inlet opening is located physically away from and may face the same or a different direction from the outlet opening); (b) a pattern of electrically conductive material arranged adjacent to the outlet opening; (c) an incompressible or substantially incompressible material within the chamber that, at least in part, changes a direction or location of an applied force from a force applied through the inlet opening to a force delivered at the outlet opening; (d) means for applying a force to the incompressible or substantially incompressible material via the inlet opening; and (e) a film material arranged adjacent the outlet opening and the pattern of electrically conductive material, wherein the force passing through the chamber (from inlet to outlet) is incident on the film material, which contacts the pattern of electrically conductive material and thereby changes an electrical conductivity property associated with the electrically conductive material. Electronic or digital pens or styli in accordance with at least some examples of this invention may include: (a) a body member having a longitudinal direction; (b) a substrate, including a pattern of electrically conductive material on a major surface thereof, arranged at least partially within the body member; (c) a writing surface contacting member mounted at least partially within the body member; (d) means for changing a direction or location of application of a force transmitted via the writing surface contacting member in response to contact with a writing surface from a first direction or location to a second direction or location; and (e) means for changing an electrical conductivity property associated with the pattern of electrically conductive material on the substrate based on the force with which the writing surface contacting member contacts the writing surface. Still additional aspects of this invention relate to methods for measuring force, such as writing force incident on electronic pens or styli, e.g., using the various systems or devices described above.

BRIEF DESCRIPTION OF THE DRAWINGS

The above and other objects, features, and advantages of the present invention will be more readily apparent and more fully understood from the following detailed description, taken in conjunction with the appended drawings, in which.

When the same reference number is used in more than one of the attached drawings, the reference number is intended to refer to the same or similar parts, features, or elements in the various different drawings.

DETAILED DESCRIPTION

As described above, aspects of the present invention relate to systems and methods for measuring incident force, e.g., writing force applied to an electronic pen or stylus. The following description is divided into sub-sections to assist the reader. The sub-sections include: Terms; General Description of Various Aspects of the Invention; Example Force Sensing Systems and Methods According to the Invention; and Conclusion.

I. TERMS

The following terms are used in this specification and, unless otherwise specified or clear from the context, the terms have the meanings provided below:

"Pen"—Any type of user input device useful in generating electronic ink or other data by handwriting, and/or useful in entering electronic ink into and/or otherwise manipulating or controlling an electronic document, a user interface, and/or a computer operating system. In at least some instances, a "pen" also may include an ink supply or reservoir and produce a conventional ink stroke, e.g., on a piece of conventional paper. The terms "pen" and "stylus" may be used synonymously and interchangeably in this specification. Also, the terms "electronic pen" (or "stylus") and in "digital pen" (or "stylus") may be used synonymously and interchangeably in this specification.

"Pen-Down State"—A state that is initiated at the time a pen contacts a digitizer, piece of paper, or other writing surface. Typically, a pen-down state will end at the time the pen leaves the digitizer, paper, or other writing surface (also called a "pen-up state"). Electronic ink data may be collected based on movement of a pen during a pen-down state, e.g., as an electronic ink stroke, a conventional ink stroke, and/or in other manners, including in conventional manners as are known in the art.

II. GENERAL DESCRIPTION OF VARIOUS ASPECTS OF THE INVENTION

As generally described above, aspects of the present invention relate to systems and methods for measuring incident force, e.g., resistors for measuring force and/or other force measuring systems, e.g., for measuring incident force applied to electronic or digital pens, styli, or other products. One more specific aspect of this invention relates to force measuring systems capable of changing a direction or location of an incident force. Such force measuring systems (e.g., resistor systems for measuring force) may include: (a) a body member having a chamber defined therein, wherein the chamber includes a first inlet opening and a first outlet opening, wherein the first inlet opening is located physically away from and may face the same or a different direction from the first outlet opening; (b) a pattern of electrically conductive material arranged adjacent to the first outlet opening; (c) an incompressible or substantially incompressible material included within the chamber, wherein the incompressible or substantially incompressible material, at least in part, changes a direction or location of an applied force from a force applied in a first direction or location passing through the first inlet opening to a force delivered in a second direction or location at the first outlet opening; (d) means for applying a force to the incompressible or substantially incompressible material in the chamber via the first inlet opening; and (e) a film material arranged adjacent the first outlet opening and the pattern of electrically conductive material, wherein a force corresponding to the force applied in the first direction or location is applied to the pattern of electrically conductive material through the film material and the first outlet opening. A wall or other structural element(s) may be arranged in the chamber in a manner such that the incompressible or substantially incompressible material will contact the wall or other element(s) to thereby change the direction or location of the applied force from the first direction or location to the second direction or location.

The film material, as described above, may be used to change an electrical conductivity property associated with the pattern of electrically conductive material, e.g., based on an area of the film material that contacts the pattern of electrically conductive material when force is applied to the film material through the first outlet opening. In this manner, the electrical conductivity associated with the pattern of electrically conductive material may be varied in a manner corresponding to the force applied to the incompressible or substantially incompressible material (e.g., an increased electrical conductivity at the pattern may be observed as the force applied to or by the pen increases). The film material may be comprised of a flexible metallic foil, a polymeric material, a polymeric material that includes an electrically conductive material (e.g., a polyethylene, polyester, and/or nylon material sputtered, coated, or impregnated with an electrically conductive material, such as carbon, copper, gold, silver, etc.), or the like.

In at least some examples, aspects of this invention will relate to electronic or digital pens or styli. At least some examples of such digital pens or styli may include: (a) a body member having a longitudinal direction; (b) a substrate (such as a printed circuit board) arranged at least partially within the body member, wherein the substrate includes at least one pattern of electrically conductive material on a first major surface thereof, wherein the first major surface extends in substantially the longitudinal direction; (c) a writing surface contacting member mounted at least partially within the body member; (d) means for changing a direction or location of application of a force transmitted via the writing surface contacting member in response to contact with a writing surface from a force applied in a first direction or location to a force delivered in a second direction or location; and (e) means for changing an electrical conductivity property associated with the pattern of electrically conductive material on the substrate based on the force with which the writing surface contacting member contacts the writing surface, wherein the means for changing the electrical conductivity property is responsive to the force applied in the second direction or location. The writing surface contacting member may directly or indirectly contact the writing surface in use of the digital pen.

Various structures may be used as at least part of the means for changing the direction or location of application of the force without departing from this invention. For example, the means for changing the direction or location may include: (a) a housing having a first inlet opening (e.g., facing the longitudinal direction of the pen body member) and a first outlet opening (e.g., facing in a different direction and/or at a different location), wherein the housing defines a chamber, and wherein the first outlet opening is arranged adjacent to the pattern of electrically conductive material, and (b) an incompressible or substantially incompressible material included within the chamber, wherein the force applied in the first direction or location is transmitted to the incompressible or substantially incompressible material within the chamber through the chamber inlet opening, through the incompressible or substantially incompressible material, and delivered to the chamber outlet opening as the force in the second direction or location. The housing further may include a wall member therein, e.g., optionally arranged at an angle with respect to the longitudinal direction, wherein the incompressible or substantially incompressible material contacts the wall element under the applied force to thereby change the direction or location of the force. As still another example, the means for changing the direction or location may include a spring member (e.g., a leaf spring) arranged between the writing surface contacting member and a spring retaining member, wherein the spring member expands or buckles in a direction other than the longitudinal direction to thereby deliver the force in the second direction or location. Of course, other ways of changing the direction or location of application of the force also may be used without departing from the invention, such as a lever or pivoting arm arrangement or an elastomeric dome that buckles or collapses in a predetermined and/or predictable manner.

The means for changing the electrical conductivity property associated with the pattern of electrically conductive material also may take on various different forms and structures and may include a wide variety of elements without departing from this invention. For example, in at least some example structures, the means for changing the electrical conductivity property associated with the pattern of electrically conductive material may include a film material (e.g., an electrically conductive film material, an electrically resistive film material, a semiconductor film material, etc.) arranged adjacent the pattern of electrically conductive material and the first outlet opening. The electrical conductivity associated with the pattern of electrically conductive material may be changed, e.g., based on an area of the film material that contacts the pattern of electrically conductive material when the force in the second direction or location is applied to the film material through the means for changing the direction or location. As another example, the means for changing the electrical conductivity property associated with the pattern of electrically conductive material may include a film material of the type described above arranged adjacent a pattern of electrically conductive material and a portion of a spring member, wherein the electrically conductive property changes based on an area of the electrically conductive film material that contacts the pattern of electrically conductive material when the force is applied in the second direction or location via the spring member. Of course, other ways of varying the electrical conductivity property associated with a pattern of electrically conductive material also may be used without departing from the invention.

Still additional aspects of this invention relate to methods for measuring forces, such as the force with which a writing instrument (e.g., an electronic or digital pen) contacts a writing surface. Such methods may include, for example: (a) contacting a writing surface contacting member of a digital pen (directly or indirectly) with a surface and thereby (directly or indirectly) applying a writing force to the writing surface contacting member, wherein the writing force has a major component in a longitudinal direction of the pen; (b) changing a direction or location of the writing force such that the writing force is translated or has a major component in a direction other than the longitudinal direction (e.g., in a direction transverse or substantially transverse to the longitudinal direction); and (c) changing an electrical conductivity property associated with a pattern of electrically conductive material based on the writing force, wherein the electrical conductivity property is changed in response to the force having the major component in the direction other than the longitudinal direction. In at least some examples of this aspect of the invention, the direction of application of the writing force may be changed by applying the writing force to an incompressible or substantially incompressible material provided in a chamber, wherein the chamber has an inlet opening allowing application of the writing force to the incompressible or substantially incompressible material, and delivering the force at an outlet opening of the chamber, thereby allowing application of the force outside of the chamber in the direction other than the longitudinal direction (e.g., if the outlet opening faces a direction other than the longitudinal direction). A wall may be provided within the chamber to assist in altering the direction of force application. In some example methods according to this invention, the electrical conductivity property associated with the pattern of electrically conductive material may be changed based on an area of a film material (e.g., a film material made from or impregnated with an electrically conductive material) that contacts the pattern, wherein the area of the film material that contacts the pattern depends on the force component applied to the film material in the direction other than the longitudinal direction. Of course, other ways of changing the direction of force application and/or changing the electrical conductivity property may be used without departing from this invention.

Features of the invention now will be described in conjunction with the attached figures, which illustrate various examples of the invention and/or contain information to help explain aspects of the invention. The specific figures and information contained in this detailed description should be construed as providing examples of the invention and not as limiting the invention.

III. EXAMPLE FORCE SENSING SYSTEMS AND METHODS ACCORDING TO THE INVENTION

As described above, aspects of the present invention relate generally to systems and methods for measuring incident force, e.g., resistor systems for measuring force and/or other force measuring systems, e.g., for electronic or digital pens, styli, or other products. While several figures in this application illustrate application of aspects of this invention to digital pens or styli, those skilled in the art will appreciate that aspects of the invention also may be readily extended to other force measuring systems and methods.

Figures 1A, 1B:
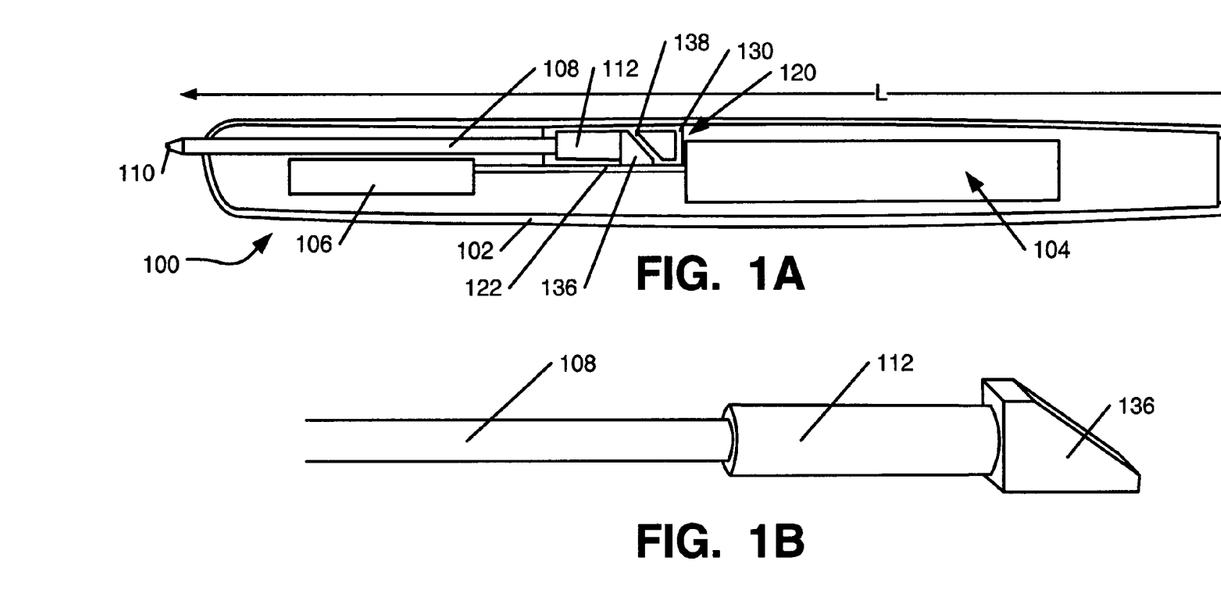
FIGS. 1A through 1C illustrate various features and elements included in force measuring systems in accordance with at least some examples of this invention, wherein the force measuring system is provided in an electronic or digital pen or stylus in this example structure.

FIG. 1A generally illustrates an example electronic or digital pen or stylus structure 100 that may be equipped with writing force or pressure measuring or sensing equipment in accordance with at least some examples of this invention. As shown, the electronic pen structure 100 includes a body member 102, e.g., made from metal, plastic, and/or other materials, including conventional materials known and used in the art. The body member 102 may have a one-piece construction or a multiple piece construction (e.g., multiple pieces fit together via threads, via a friction fit, via mechanical connections, etc.) without departing from the invention. As shown in FIG. 1A, the body member 102 generally is oriented so as to have its major dimension extending along an axial or longitudinal direction L of the electronic pen structure 100. The various parts and general construction of the pen body member 102 and any connections between the various parts thereof may be of types that are conventional and known to those skilled in the art.

An electronic pen structure 100 according to examples of this invention may include various internal electronic components 104, such as a camera member or other sensor 106 and other conventional components known and used in the art. Because at least many of the electronic components 104 may be conventional and commercially available (in at least some examples of electronic pen structures 100 in accordance with this invention), many of these components 104 will not be described in further detail in this specification. Rather, the content of this specification will focus on the various structures and interconnections that relate to and/or impact various features and aspects of the invention.

Electronic pen structures 100 in accordance with examples of this invention may include a writing surface contacting member 108 mounted at least partially within the body member 102 (the writing surface contacting member 108 may directly or indirectly contact the writing surface in use such that the writing force is applied to it). For electronic pen structures 100 that dispense physical ink, the nub 110 of the writing surface contacting member 108 may include a felt tip, a fountain pen tip, a ball point dispenser, or other structure for controllably releasing or dispensing ink onto a writing surface, including conventional pen nub structures known and used in the art. The writing surface contacting member 108 may be connected to an ink reservoir 112, which provides an extended supply of ink, and/or the contacting member 108 itself may constitute at least a portion of an ink reservoir. As shown in FIG. 1A, the major dimension of the writing surface contacting member 108 may extend in (or substantial extend in) the longitudinal direction L of the pen structure 100. For electronic stylus structures 100 that do not dispense physical ink onto a writing surface, the stylus structure 100 still may include a writing surface contacting member 108 with a writing surface contacting tip or nub 110 of some sort, to mimic, at least to some degree, the look and feel of writing on paper with a pen (even though the stylus structure 100 may be used, for example, to generate electronic ink, e.g., on a PDA, tablet PC, or other pen-based computing system). Rather than an ink reservoir, for electronic stylus structures 100 that do not dispense ink, the writing surface contacting member 108 may directly or indirectly contact and/or connect to a plunger element 112 that helps move the writing force or pressure incident on the writing surface contacting member 108 into the stylus structure 100. In other example structures, if desired, the writing surface contacting member 108 may perform the functions of the plunger 112, such that a separate plunger 112 is not needed. Alternatively, the writing surface contacting member may utilize pencil lead or other non-ink marking materials, including a mechanism to dispense the pencil lead (or other material). Mechanisms to dispense pencil lead or other materials of this type are well known to those skilled in the art.

As described above, a user's handwriting, in at least some instances, can convey information through the physical appearance of the strokes on a page in addition to their underlying content (e.g., through line thickness, etc.). In order to capture line thickness or other similar force or pressure information when writing, electronic pen structures 100 in accordance with examples of this invention include an on-board writing force or pressure sensor 120. Various components of example on-board writing force or pressure sensors 120 useful in examples of this invention are described in more detail below in conjunction with FIGS. 1A through 3B.

Figure 1C:
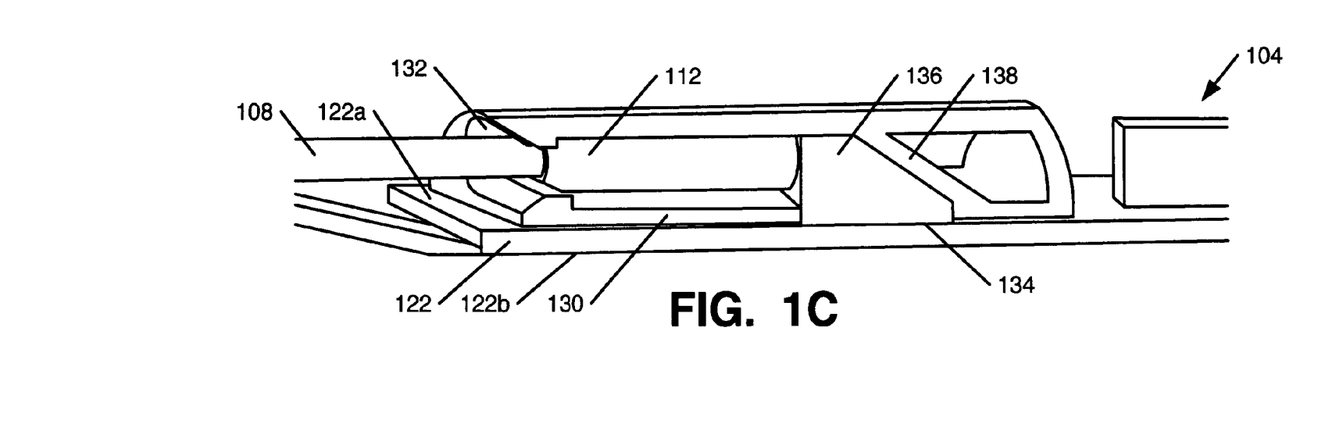

When equipped with writing force sensing equipment, conventional electronic pen devices typically have had at least some major portion of their force sensing elements oriented normal to the direction of the applied writing force (i.e., the writing force pushes inward on the ink refill or other writing surface contacting member along the longitudinal direction of the pen, so conventional force sensing elements in electronic pens typically have had a relatively large size in a direction normal or transverse to the longitudinal direction). Pens of this conventional type tend to have an increased diameter or cross-sectional area, particularly in the pen grip zone, which tends to make the pens uncomfortably thick and/or difficult to use. In order to address this issue, pen structures 100 in accordance with at least some examples of this invention include writing force or pressure sensors 120 that have at least some of their components oriented with their major dimensions extending in the longitudinal direction L. For example, as shown in FIGS. 1A and 1C, the writing force or pressure sensor 120 of this example pen structure 100 includes a substrate 122, such as a printed circuit board or other suitable base member, arranged at least partially within the body member 102 of the pen structure 100. This substrate 122 is arranged such that its major surfaces (i.e., the top surface 122a and opposite bottom surface 122b) and its major dimension extend in (or substantially in) the longitudinal direction L of the pen structure 100. Various electronic components 104 of the electronic pen structure 100 may be mounted on the substrate 122 and/or interconnected by conductors included on the substrate 122, as generally shown in FIG. 1A. In at least some example pen structures 100, at least some portion of the writing surface contacting member 108 may be arranged parallel to and/or overlapping with at least some portion of the top surface 122a of the substrate 122 (e.g., when the pen structure 100 is viewed from the side, e.g., as shown in FIGS. 1A and 1C).

Figure 2:
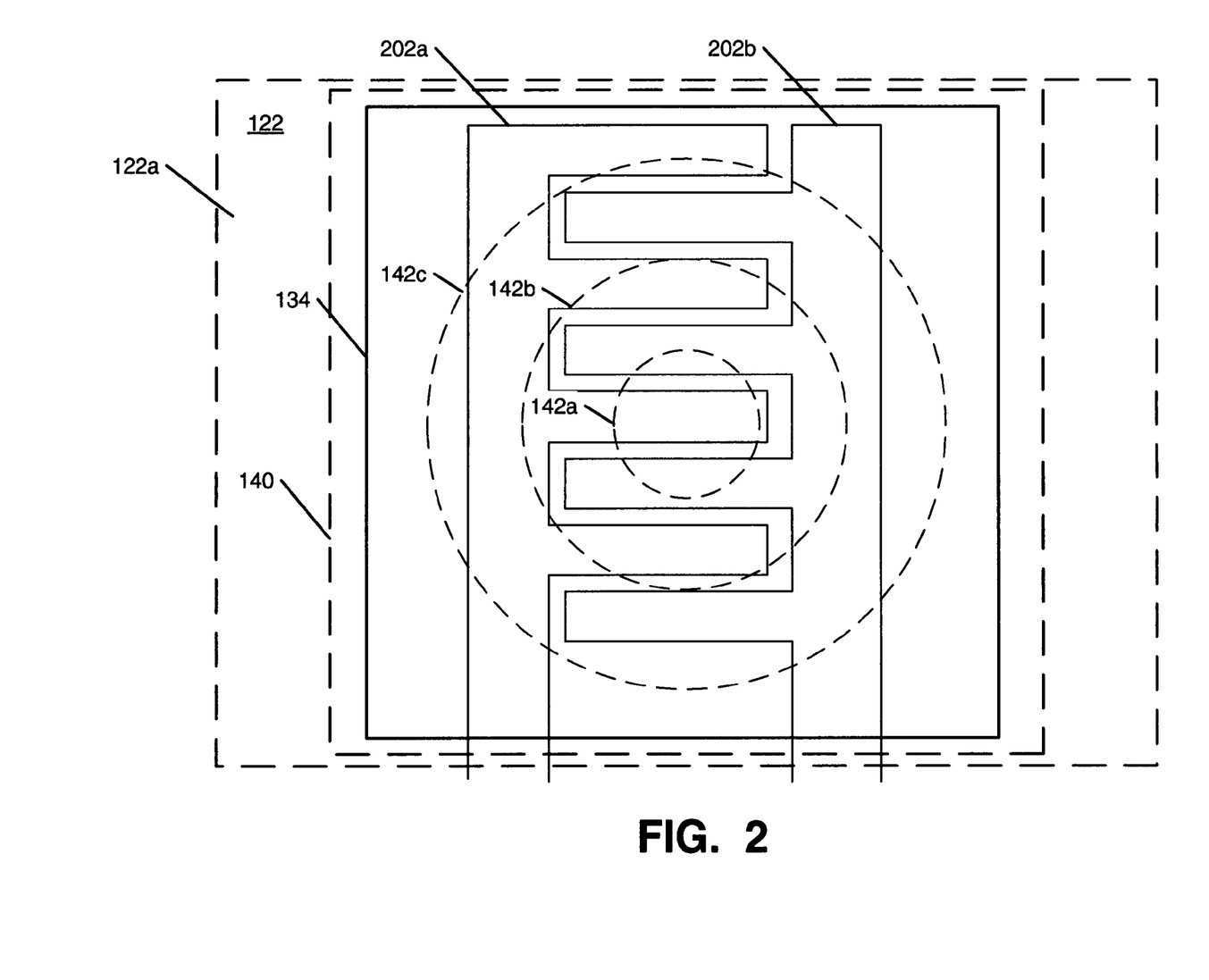
FIGS. 2, 2A, and 2B illustrate aspects of structure for changing an electrical conductivity property associated with a pattern of electrically conductive material on a substrate in accordance with at least some examples of this invention.
Figure 2A:
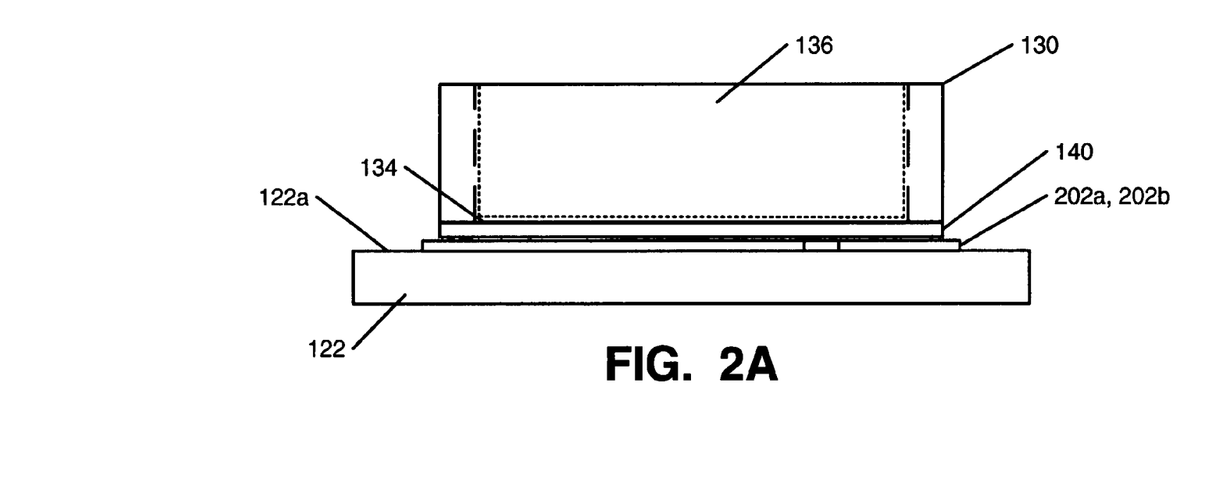
Figure 2B:
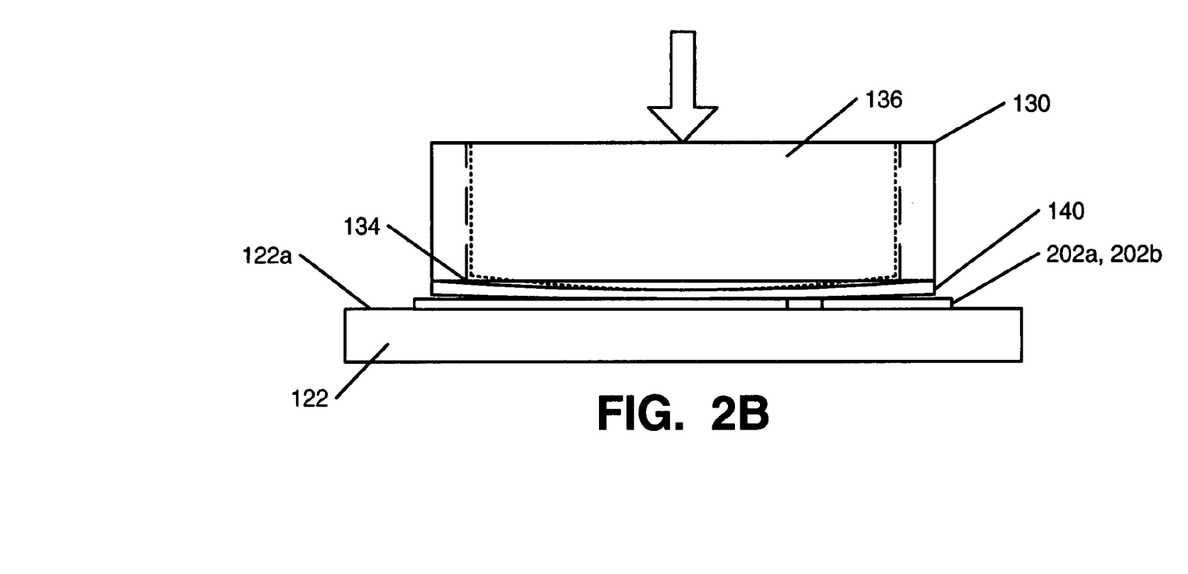

The substrate 122 also may include structures and components used in measuring the force applied (directly or indirectly) to the writing force contacting member 108 during writing. For example, as shown in FIG. 2, the substrate 122 in this example structure 100 may include at least one pattern of electrically conductive material on one of its major surfaces (two patterns 202a and 202b of electrically conductive material (such as copper, silver, gold, carbon, or the like, and/or ink derivatives or alloys of these materials) are shown on the top surface 122a of substrate 122 in this example). By measuring changes in electrical conductivity, electrical resistivity, or other electrical properties in the two patterns 202a and 202b, the incident writing force or pressure on the pen nub 110 (e.g., the force with which the writing surface contacting member 108 contacts a writing surface) may be measured and/or determined.

As mentioned above, in conventional electronic pens, the writing force is applied, e.g., via a writing force contacting member and optionally a plunger and/or ink reservoir, to a force sensing element arranged orthogonal to the pen's longitudinal direction (and thus, orthogonal to the writing force contacting member). Such structures, however, tended to produce uncomfortably and/or excessively thick pen structures. Therefore, in accordance with at least some examples of this invention, an electronic pen structure 100 may include a means for changing a direction or location of application of a writing force transmitted via the writing surface contacting member 108 in response to contact with a writing surface. More specifically, electronic pen structures 100 according to at least some examples of this invention include structures or components that change the writing force from a force applied in a first direction or location (e.g., in the longitudinal or axial direction L along the writing surface contacting member 108 and/or plunger 112) to a force delivered in a second direction or location (e.g., in a direction transverse or substantially transverse to the longitudinal direction L). In this manner, force sensing elements (such as the electrical conductor patterns 202a and 202b on substrate surface 122a described above) may be oriented parallel or substantially parallel to the longitudinal direction L and still provide accurate, reliable, and sensitive measurements of writing force pressure.

In this example electronic pen structure 100, the means for changing the direction or location of the applied writing force includes a housing member 130 into which the writing surface contacting member 108 and/or the plunger or ink reservoir 112 extend (in the illustrated example, the plunger or ink reservoir 112 is completely contained within the housing member 130, although other structural orientations and arrangements are possible without departing from this invention). If desired, in at least some examples of this invention, the housing member 130 (and any corresponding internal elements and structures, as described in more detail below) may form at least a portion of an ink refill cartridge and/or an ink reservoir for the pen structure 100 (if the pen dispenses physical ink). The housing member 130 defines an interior chamber that includes at least a first inlet opening arranged to allow entry of an incident force in the longitudinal direction L and a first outlet opening arranged to allow delivery of the incident force in a direction other than the longitudinal direction L. In the illustrated example, the housing member 130 includes an inlet opening 132 through which the writing surface contacting member 108 and/or plunger 112 extends (the housing member 130 is shown in a partial cutaway view in FIGS. 1A and 1C). The housing member 130 further includes an outlet opening 134 arranged adjacent to the pattern(s) of electrically conductive material 202a and/or 202b provided on the substrate surface 122a. In the view shown in FIG. 1C, the pattern(s) of electrically conductive material 202a and/or 202b (not shown in FIG. 1C) are provided on the top major surface 122a of the substrate 122, between the housing member 130 and the substrate top surface 122a.

An incompressible (or substantially incompressible) material (at least under typical conditions of use of the pen structure 100) may be included within the chamber of the housing member 130. The plunger or ink reservoir 112 may constitute at least a portion of the incompressible (or substantially incompressible) material located within the housing member 130. In the illustrated example structure 100, a flexible material 136 forms a portion of the incompressible (or substantially incompressible) material located in the housing member 130. The writing surface contacting member 108 and/or the plunger 112 may directly or indirectly connect with the material 136 (e.g., via threads or mechanical connectors), or it (they) may simply abut one another without departing from the invention. Any desired material(s) may be used as the incompressible or substantially incompressible material 136, including flexible materials such as silicones, urethanes, rubbers, polymeric materials, and the like. In some examples, low durometer silicones, urethanes, and rubbers may be used to provide a flexible material sufficiently soft to deliver a responsive signal to the force measuring system (or other pressure sensing systems) used for measuring forces typically generated by users when writing. Alternatively, other incompressible or substantially incompressible materials in the environment of use (e.g., with respect to typical writing forces) may be used, such as liquids (e.g., in a flexible bag or container), gases (e.g., in a flexible bag or container), etc.

In use, the incident or applied writing force, e.g., from contact of the pen nub 110 with a writing surface, extends via the writing force contacting member 108 in generally the longitudinal direction L and into the pen structure 100. The force extends through the writing force contacting member 108, through the inlet opening 132 of the housing member 130, to an optional plunger 112 and/or another incompressible (or substantially incompressible) material 136 (if desired, the plunger 112 and material 136 may constitute a single, one-piece structure and/or may be made from the same material). Because the chamber of the housing member 130 in this example structure 100 is filled or substantially filled with incompressible (or substantially incompressible) materials (such as plunger 112, material 136, etc.), the incident force enters the housing member 130 through the inlet opening 132 and then exits the housing member 130 through its outlet opening 134. Because the outlet opening 134 is located physically away from and/or faces a different direction from the inlet opening 132, the housing member 130 and the incompressible material(s) (e.g., material 136) contained therein act to change the direction or location of the incident or applied writing force. In this illustrated example, the incident force (from writing) in the longitudinal direction is converted to an applied force delivered in a direction transverse to the longitudinal direction (i.e., downward, through the outlet opening 134, onto the top surface 122a of the substrate 122 in the illustrated example of FIGS. 1A and 1C). In this manner, the force sensing elements (e.g., patterns of electrically conductive material 202a and/or 202b) may be arranged facing upward on an axially aligned substrate 122 and may be activated in a sideways direction with respect to the pen body member 102. Thus, by orienting the force sensing elements in a direction other than orthogonal to the pen's axial or longitudinal direction L, the cross-sectional area and width dimension of the pen structure 100 can be reduced, enabling production of a thinner pen structure 100 in the typical user grip zone. Of course, the inlet opening 132 and the outlet opening 134, as well as the substrate's top surface 122a, may be arranged to face in any suitable or desired directions and/or at any desired locations without departing from at least some aspects of this invention.

The interior structure of the housing member 130, at least in part, also may help control and change the direction or location of the applied force between the housing member's inlet opening 132 and outlet opening 134. For example, additional structure that, at least in part, may help change the direction and/or location of the force includes a wall element 138 arranged within the housing member 130 at an angle (e.g., a 45° angle) with respect to the longitudinal direction L. In use, the incompressible or substantially incompressible material 136 contacts the wall element 138 under pressure from the writing force. This force is incident on the wall element 138 (through writing surface contacting member 108, plunger 112, and/or material 136), which (due to its angled orientation) thereby changes the direction and/or location of application of the force toward the outlet opening 134. Of course, if desired, other structures that help change the direction or location of application of the writing force may be used without departing from this invention.

Aspects of this invention also relate to the manner in which writing force is measured. For example, the pattern(s) of electrically conductive material 202a and/or 202b on the substrate 122 may be used to measure and determine the applied writing force. In order to allow measurement of the incident writing force, the force delivered through the outlet opening 134 of the housing member 130 must be proportional or otherwise correlate to the originally applied writing force. This may be accomplished, in accordance with at least some examples of the invention, using the housing member 130, inlet opening 132, outlet opening 134, incompressible (or substantially incompressible) material 136, and/or wall element 138 structures described above (assuming that no significant amount (or a predictable amount) of force is lost during energy transfer from the inlet opening 132 to the outlet opening 134). If desired, the signal may be magnified or demagnified (e.g., attenuated) by changing the ratio of inlet area to outlet area.

In use, electrical currents may be passed through the pattern(s) of electrically conductive materials 202a and 202b on the substrate 122, to thereby provide known or predetermined electrical conductivity properties associated with the pattern(s) 202a and 202b on the substrate 122. When a writing force is applied to the writing surface contacting element 108, this force may be used to change the electrical conductivity properties associated with the pattern(s) 202a and 202b on the substrate 122 (as will be described in more detail below), thereby providing a measure of the writing force (assuming that the electrical conductivity properties can be correlated (e.g., proportional) to the writing force (and therefore, any changes in the electrical conductivity properties associated with the pattern(s) 202a and 202b can be correlated to changes in the writing force applied to the electronic pen)).

Various structures and ways of changing the electrical conductivity properties associated with the pattern(s) of electrically conductive materials 202a and 202b on the substrate 122 based on the writing force may be used without departing from this invention. As one example, a film material 140 (see FIGS. 2, 2A, and 2B, e.g., an electrically conductive film material, optionally made from a polymer, as described above) may be arranged between the outlet opening 134 and the substrate 122 at the location of the pattern(s) of electrically conductive materials 202a and 202b on the substrate 122. When no writing force or pressure is applied to the pen nub 110, the film material 140 may be suspended above the pattern(s) of electrically conductive materials 202a and 202b (e.g., see FIG. 2A—the film material 140 may be attached to the housing member 130 in some manner so that it covers the outlet opening 134). Alternatively, if desired, the film material 140 may be arranged to just contact the pattern(s) of electrically conductive materials 202a and 202b in this neutral position (i.e., with no applied writing force) or as still another alternative, the film material 140 may be arranged to contact the pattern(s) of electrically conductive materials 202a and 202b in a base orientation. At this initial, neutral position, with no applied writing force, the electrical conductivity properties (e.g., resistance, current flow, voltage, etc.) associated with the pattern(s) of electrically conductive material 202a and 202b may be measured, and this measurement may be used as a base electrical conductivity measurement. The pattern(s) of electrically conductive material 202a and 202b are not restricted to the specific shapes shown. Any shapes may be used for these pattern(s) without departing from the invention. Moreover, the pattern(s) may be applied to the substrate (e.g., the printed circuit board), the intermediate film material 140, the writing surface contacting member (e.g., 112), the substantially incompressible material 136, and/or any other desired surface or structural element without departing from this invention.

When writing occurs, writing force is applied to the pen nub 110, which is transferred via the writing surface contacting member 108 and the plunger 112 into the housing member 130 (through inlet opening 132) and against the incompressible material 136. Because the housing member 130 is completely filled with incompressible material (e.g., plunger 112, incompressible material 136, etc.), the only avenue for the force to exit the housing member 130 is through outlet opening 134. Thus, the writing force on the pen nub 110 forces some of the flexible incompressible material 136 out of the housing member 130 at its outlet opening 134. See FIG. 2B. In this situation, the incompressible material 136 presses downward on the film material 140, which in turn presses downward on the pattern(s) of electrically conductive materials 202a and 202b on the substrate surface 122.

Contact of the film material 140 on and/or between the various pattern(s) of electrically conductive materials 202a and 202b on the substrate 122 thereby changes the electrical conductivity properties associated with these pattern(s) of electrically conductive materials 202a and 202b. More specifically, in this example structure 100, the magnitude of writing force applied at the pen nub 110 correlates in some manner to the area of contact between the film material 140 and the pattern(s) of electrically conductive materials 202a and 202b on the substrate 122. As shown in FIG. 2 (which is a view looking out the housing member 130 outlet opening 134), a relatively small or light writing force will result in a relatively small area of contact between the film material 140 and the pattern(s) of electrically conductive materials 202a and 202b on the substrate 122 (see circle area 142a), due to incompressible material 136 expelled out through the outlet opening 134. A larger writing force will result in a larger area of contact (circle area 142b), and a still larger writing force will result in a still larger area of contact (circle area 142c). Contact of the film 140 with the pattern(s) of electrically conductive materials 202a and 202b on the substrate 122 will change the measured electrical conductivity properties associated with the pattern(s) 202a and 202b from the base measurements in a manner correlatable to the contact area, and thus correlatable to the incident writing force. Thus, this combination of structures provides a system for measuring writing force applied to a pen structure 100.

If desired, in at least some examples of the invention, the film material 140 may be made from an electrically conductive material, such as a metal foil, a polymeric film material coated or impregnated with electrically conductive materials, etc. As more specific examples, the film material 140 may be a polyethylene, nylon, and/or polyester film material coated or impregnated with carbon, copper, gold, silver, or other electrically conductive material(s). As even more specific examples, commercially available anti-static or static shield polymeric films or bags of the type used to store and/or ship electronic components may be used as the material for the film material 140 (e.g., like anti-static polymeric materials available from Extra Packaging Corp. of Boca Raton, Fla.) in at least some examples of this invention.

Figure 3A:
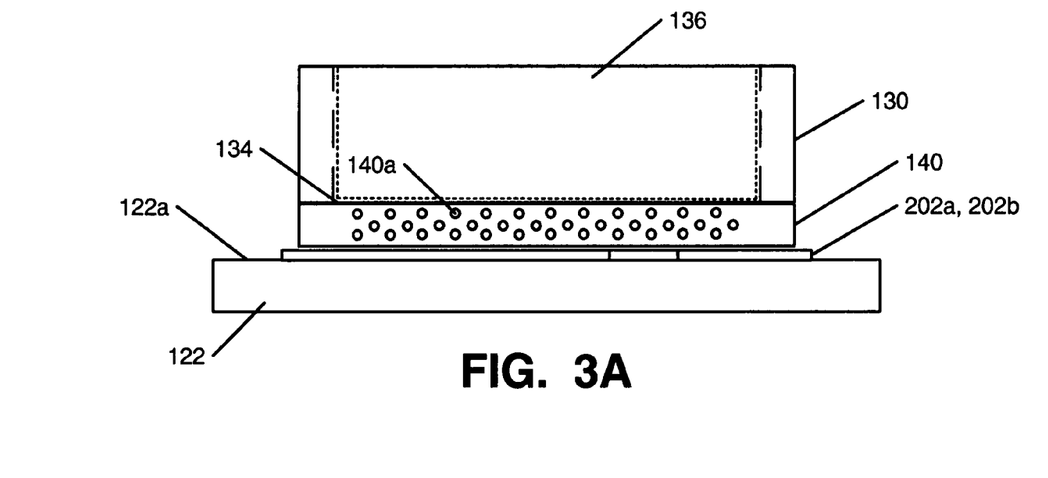
FIGS. 3A and 3B illustrate aspects of an alternative structure for changing an electrical conductivity property associated with a pattern of electrically conductive material on a substrate in accordance with at least some examples of this invention.
Figure 3B:
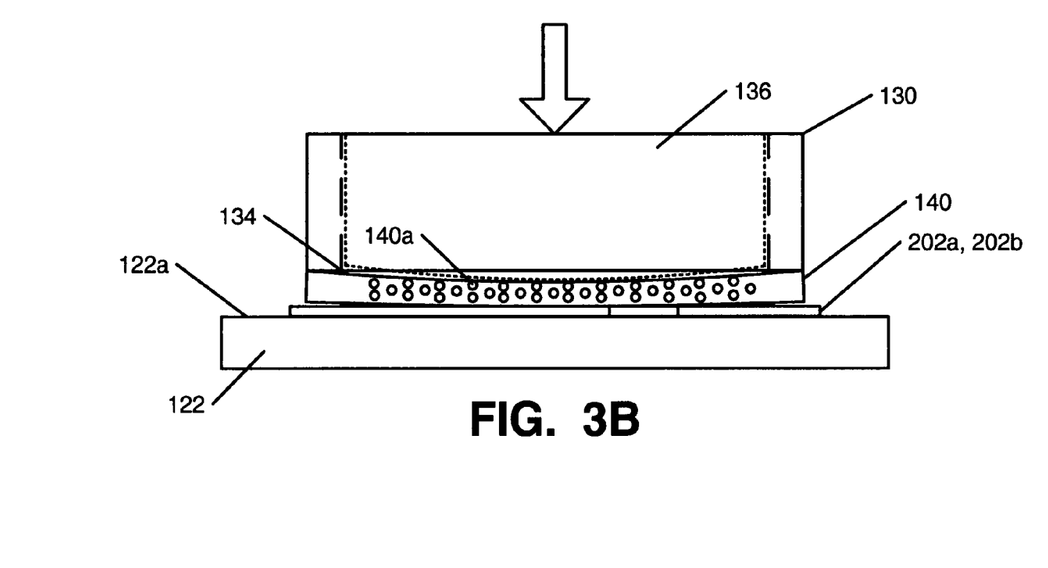

Still another example of structures and ways for changing the electrical conductivity properties of patterns of conductive materials are illustrated in FIGS. 3A and 3B. In this example, the film material 140, optionally with electrically conductive material 140a impregnated therein (such as carbon), may be arranged to just contact the pattern(s) of electrically conductive materials 202a and 202b on the substrate 122 in the base or neutral orientation (as shown in FIG. 3A). A base measurement of the electrical conductivity properties associated with the pattern(s) of electrically conductive materials 202a and 202b on the substrate 122 may be measured in this base or neutral orientation. In this example, the film material 140 is compressible (at least somewhat compressible). Therefore, when writing pressure is applied to the pen nub 110 to thereby move the incompressible (or substantially incompressible) material 136 out of its neutral orientation and into contact with the film material 140, the film material 140 will compress between the material 136 and the surface 122a of the substrate 122 (as shown in FIG. 3B), thereby changing the electrical conductivity properties of the film 140 (by making more conductive material 140a present per unit volume of the film material 140, thereby decreasing its electrical resistance as pressure is applied). This compression also changes the electrical conductivity properties associated with the pattern(s) of electrically conductive material 202a and 202b (and hence the electrical conductivity properties measured by the system). The changes in the electrical conductivity properties correlate to and correspond to the force incident on the writing surface contacting member 108. If desired, in at least some examples of this invention, a compressible version of the film material 140 may be provided by applying multiple layers of the polymeric film materials (e.g., the anti-static bag materials) described above over the housing member 130 outlet opening 134. Of course, if desired, the various methods of changing the level of electrical conductivity described above may be used independently or in combination (e.g., force measuring systems may use film deflection (e.g., FIGS. 2A and 2B) and film compression (e.g., FIGS. 3A and 3B) either together or separately). When used together, an increased (or changed) conductivity contribution may be provided via each mechanism to thereby produce an even higher overall change than would be experienced when using only one mechanism.

As another potential example, rather than providing a separate film material 140, if desired, the incompressible (or substantially incompressible) material 136 itself may directly contact the pattern(s) of electrically conductive materials 202a and 202b on the substrate 122 when force is applied to the pen nub 110, and the area of contact between the incompressible (or substantially incompressible) material 136 and the pattern(s) of electrically conductive materials 202a and 202b may be correlated to the writing force in the general manner described above. In such an example structure, the incompressible (or substantially incompressible) material 136 optionally may include an electrically conductive material (e.g., impregnated, coated, sputtered, or otherwise provided at least at the end portion of the material 136 extending through the outlet opening 134). As still another alternative, if desired, at least the end portion of the incompressible (or substantially incompressible) material 136 extending through the outlet opening 134 (in contact with or proximate to the substrate surface 122a) may be somewhat compressible, optionally with conductive material contained therein, to function in the manner described above in connection with FIGS. 3A and 3B.

Of course, other structures and/or geometries for the housing member 130, incompressible material 136, and the like may be used without departing from this invention. For example, a volume of any shape or size could be used for the housing member, provided that the housing member is filled with an incompressible material and has at least one inlet region where the pressure input is applied and at least one exit region where the resulting pressure is delivered (to be measured). Also, if desired, multiple inlets and/or multiple outlets may be provided in the housing member structure, and/or the inlet opening(s) may be sized and/or shaped different from the outlet opening(s) (e.g., to potentially magnify or demagnify the original writing surface contacting force signal) without departing from the invention. Additionally, if desired, sensors other than resistor based technology for measuring force may be used without departing from this invention, such as optical sensors, magnetic sensors, and the like.

Figure 4:
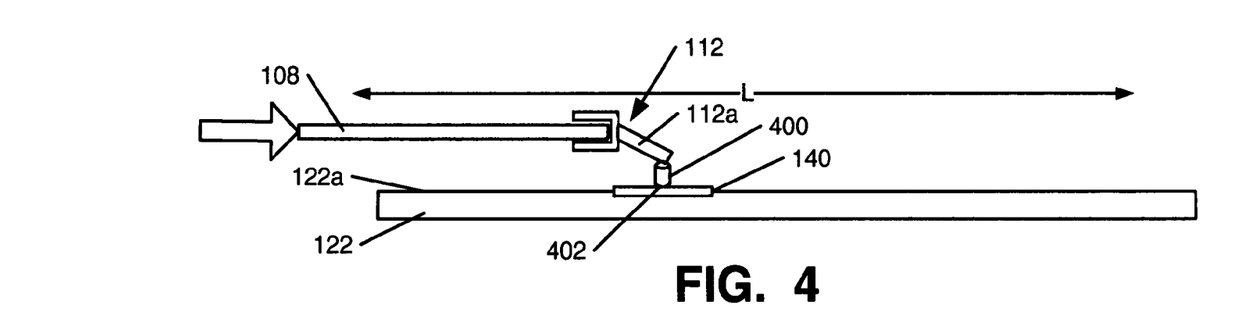
FIG. 4 illustrates another example force measuring system in accordance with this invention, e.g., for use in an electronic or digital pen or stylus.

Other structures and/or methods for changing the direction or location of the incident writing force (e.g., from the longitudinal direction L to another direction or location, such as transverse to the longitudinal direction L) may be used without departing from this invention. For example, as shown in FIG. 4, a writing surface contacting member 108 (arranged in the longitudinal direction L of a pen body) may be received in a plunger 112, ink reservoir, or other structure. The plunger 112 may include a shaft member 112a that extends in a direction away from the longitudinal direction L. This shaft member 112a or other portion of the plunger member 112 may attach to a cylinder member 400 also, arranged in this example structure to extend in a direction other than the longitudinal direction L (in the illustrated example, the cylinder member 400, which may be made from a solid, incompressible material, extends in a direction transverse to the longitudinal direction L). The plunger 112 and/or shaft member 112a cylinder member 400 may be connected in any desired manner, e.g., using a ball and socket type joint or other mechanical connector. The cylinder member 400 may have a domed end surface 402 (e.g., a lower end surface) that contacts a film material 140 located over pattern(s) of electrically conductive material on a substrate 122 surface 122a, as described above (notably, in this example structure, the major surface 122a of the substrate 122 may be maintained parallel (or substantially parallel) to the longitudinal direction L of the pen body, thereby maintaining a relatively small cross-sectional area or diameter in the grip zone). In this manner, as generally described above in conjunction with FIGS. 2-2B, writing force applied in the longitudinal direction L may be converted to a force in another direction and/or at another location, and the area of contact between the domed end surface 402 of the cylinder 400, through the film material 140, will change the measured electrical conductivity properties associated with the pattern(s) of electrically conductive material on the substrate 122 in a manner correlatable to the incident writing force in the longitudinal direction L.

Of course, many variations in this structure are possible without departing from the invention. For example, if desired, the film material 140 may be omitted and the domed end surface 402 of the cylinder 400 may directly contact the pattern(s) of electrically conductive material on the substrate surface 122. Also, if desired, at least some of the various modifications and alternative structures described above in conjunction with FIGS. 1A through 3B may be used without departing from this invention.

Figure 5:
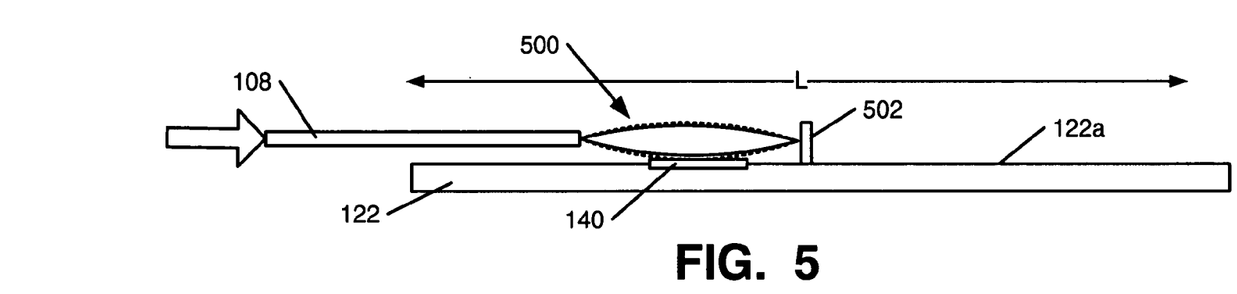
FIG. 5 illustrates another example force measuring system in accordance with this invention, e.g., for use in an electronic or digital pen or stylus.

FIG. 5 illustrates still another example of structures and methods for changing the direction or location of the incident writing force (e.g., from the longitudinal direction L to another direction or location, such as transverse to the longitudinal direction L) that may be used in at least some examples of this invention. In this example structure, a writing surface contacting member 108 (arranged in the longitudinal direction L of a pen body), optionally with an intermediate plunger member and/or ink reservoir, may be located and oriented to engage (directly or indirectly) with a spring member 500, such as a leaf spring or other buckling member. The spring member 500 may be maintained in position in the pen body by a support or retaining member 502, which may constitute a wall member, a housing member, a cage structure, or the like. In its neutral or base position with no writing force applied to the writing surface contacting member 108 (shown in solid lines in FIG. 5), the spring member 500 may be arranged to hover slightly above or just in contact with a film material 140 located over pattern(s) of electrically conductive material on a substrate 122 surface 122a, as described above (notably, in this example structure, the major surface 122a of the substrate 122 may be maintained parallel (or substantially parallel) to the longitudinal direction L of the pen body, thereby maintaining a relatively small cross-sectional area or diameter in the grip zone). When a writing force is applied to the writing force contacting member 108 in the longitudinal direction L (e.g., a pen-down state is initiated), the spring member 500 will flex (shown in broken lines in FIG. 5) and expand in other directions such that a portion of the spring member 500 surface will contact the film material 140. The amount of writing force will determine the amount of the spring member 500 flex, which in turn will determine the amount of the spring area that contacts the film material 140. In this manner, as generally described above in conjunction with FIGS. 2-2B, writing force applied in the longitudinal direction L may be converted to a force in another direction and/or at another location, and the area of contact between the spring member 500 surface, through the film material 140, will change the measured electrical conductivity properties associated with the pattern(s) of electrically conductive material on the substrate 122 in a manner correlatable to the incident writing force in the longitudinal direction L.

Of course, many variations in this structure are possible without departing from the invention. For example, if desired, the film material 140 may be omitted and the outer surface of the spring member 500 may directly contact the pattern(s) of electrically conductive material on the substrate surface 122. Many variations in mounting the spring member 500 in a pen body member also may be used without departing from this invention. Moreover, the spring member 500 may be made from any desired material, such as metal, plastic, etc. Also, if desired, at least some of the various modifications and alternative structures described above in conjunction with FIGS. 1A through 3B may be used without departing from this invention.

As still additional examples, the means for changing the direction or location of application of force may include a pivoting member, such as a lever or other structure. For example, writing force may be applied to one side of a lever or pivoting member. The lever or pivoting member may constitute, for example, an L-shaped member or other suitable shaped member (e.g., made of a rigid material) with one arm or surface arranged to receive force (e.g., substantially orthogonal to) in the pen's longitudinal direction and a second arm or surface arranged adjacent the pattern(s) of electrically conductive material e.g., optionally in another direction or location). The pivot point of the lever or pivoting member may be arranged such that when writing force is applied to one arm or surface of the lever or pivoting member, the member will pivot or rotate so as to apply force to the pattern(s) of electrically conductive material via the second arm or surface. As another example, the force on one arm or surface of the lever or pivoting member may cause the second arm or surface to buckle, thereby applying force to the pattern(s) of electrically conductive material. Many variations in the specific lever structure are possible without departing from this invention.

Figure 6:
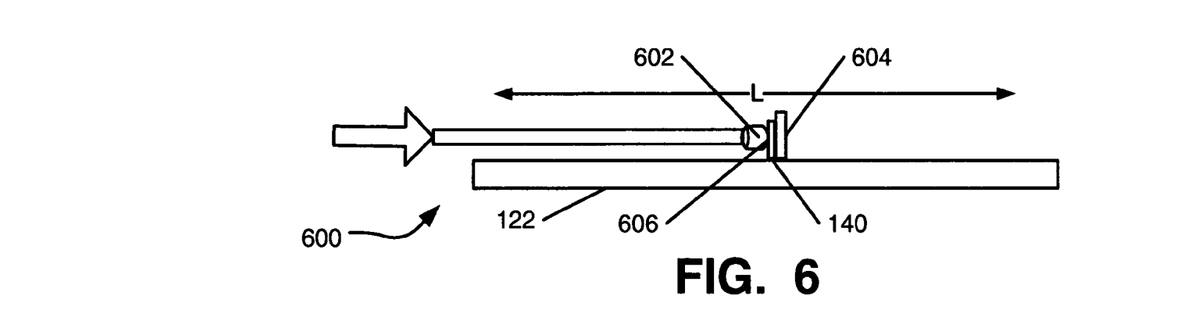
FIG. 6 illustrates still another example force measuring system in accordance with this invention, e.g., for use in an electronic or digital pen or stylus.

FIG. 6 illustrates another example force measuring system 600 that may be used in accordance with at least some examples structures of the invention. In this example structure, a writing surface contacting member 108 engages (directly or indirectly) with a plunger member 602, and writing force may be applied to the writing surface contacting member 108 in the longitudinal direction L of the pen structure. Patterns of electrically conductive material, as generally described above, may be provided on a secondary substrate 604 (such as a daughter printed circuit board) that is arranged in a direction so as to directly receive the incident force via the writing surface contacting member 108 (e.g., soldered to the base substrate 122). The plunger member 602 may have a domed end surface 606 that contacts a film material 140 located over the pattern(s) of electrically conductive material on the secondary substrate 604. Therefore, in the manner generally described above, writing force applied in the longitudinal direction L will vary the area of contact between the domed end surface 606 of the plunger member 602, through the film material 140, to thereby change the measured electrical conductivity properties associated with the pattern(s) of electrically conductive material on the secondary substrate 604 in a manner correlatable to the incident writing force in the longitudinal direction L. Notably, in this example structure, the incident force is not changed from the longitudinal direction L to another direction, although a secondary substrate 604 may be used, if desired, in structures in which the incident force is changed from the longitudinal direction L to another direction without departing from this invention.

Of course, many variations in this structure are possible without departing from the invention. For example, if desired, at least some of the various modifications and alternative structures described above in connection with FIGS. 1A through 3B may be used without departing from this invention.

Figure 7:
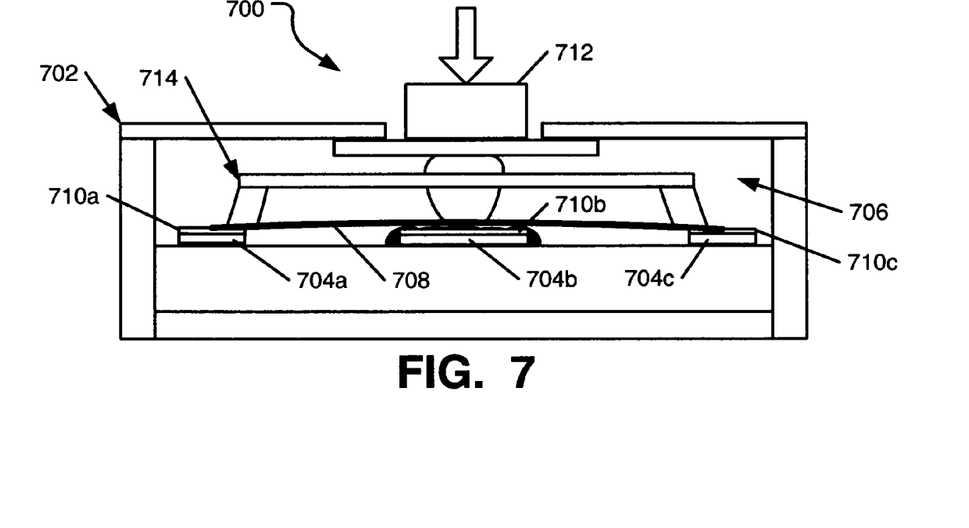
FIG. 7 illustrates an example force measuring system in accordance with this invention in the form of a "pushbutton" switch.

FIG. 7 illustrates an example force sensing system 700 (e.g., of a "pushbutton" type) that may be used in a wide variety of different environments, including in an electronic pen or stylus structure (as will be described in more detail in conjunction with FIG. 8). In particular, aspects of this invention may be used to change an "on/off" type button switch to one having variable force measurement characteristics and responses, e.g., to an "analog" sensor, to enable production of various systems or features, such as a Pirelli module, variable or continuous scrolling (e.g., changing scrolling speed or characteristics depending on mouse button pressure, etc.), digital ink profiles (e.g., line thicknesses), selection features (e.g., for cut, paste, copy, etc.), video games features, etc.

The example force sensing system structure 700 of FIG. 7 includes a housing member 702, which may be made from one or more pieces of any suitable or desired material, including metals, polymers, and/or other conventional switch or other housing materials known and used in the art. Contact pads 704a, 704b, and 704c are included in the interior chamber 706 of the housing member 702, and a contact dome 708 extends between the two end contact pads 704a and 704c and over the center contact pad 704b when the force sensing system structure 700 in the neutral or base position (e.g., with no force applied thereto). A thin film material 710a, 710b, and 710c, e.g., of the type described above (e.g., a metal foil, a polymeric film material (such as a polyethylene material sputtered, coated, or impregnated with an electrically conductive material), an anti-static bag material, etc.) may be provided between the contact dome 708 and the various contact pads 704a, 704b, and 704c, respectively. The thin film materials 710a, 710b, and 710c may overlay patterns of electrically conductive materials provided in and/or on the top surfaces of the contact pads 704a, 704b, and 704c.

A pushbutton plunger 712 (e.g., such as a mouse button) is provided at the exterior of the housing member 702. The force with which this plunger 712 is pressed may be measured in systems and methods in accordance with examples of this invention, as will be described in more detail below. A connecting structure 714, which may comprise one or more separate structural elements, connects the plunger 712 with the contact dome 708, optionally at or near the various areas adjacent to the contact pads 704a, 704b, and 704c. The connecting structure 714 may be made of any suitable or desired material without departing from this invention, such as elastomeric materials, metal materials, etc.

In use, a user will press downward on the plunger 712, and the force from this action is transferred to the contact dome 708 via the connecting structure 714. A relatively light pressing force will flatten the contact dome 708 somewhat, thereby changing the area of the contact dome 708 that contacts the outer contact pads 704a and 704c through the thin film material 710a and 710c, respectively. Light pressure may not be sufficient to make contact between the center of the contact dome 708 and the center contact pad 704b (through thin film material 710b). Accordingly, the plunger 712 depression pressure may be measured based on the change in electrical conductivity properties associated with the pattern(s) of electrically conductive materials on the contact pads 704a and 704c due to changes in the area of contact between the edges of the contact dome 708 and the contact pads 704a and 704c through thin films 710a and 710c, respectively. Higher pressures may further flatten the contact dome 708, causing a greater area of the edges of the contact dome 708 to contact the contact pads 704a and 704c through the thin films 710a and 710c, respectively, which will be measurable by changes in the electrical conductivity properties associated with the pattern(s) of electrically conductive material on the contact pads 704a and 704c. Still higher pressures will further flatten the contact dome 708 and cause contact between the center of the contact dome 708 and the center contact pad 704b (through thin film 710b) in addition to contact between the edges of the contact dome 708 and contact pads 704a and 704c through the thin films 710a and 710c, respectively. The areas of contacts will cause measurable changes in the electrical conductivity properties associated with the pattern(s) of electrically conductive material on the contact pads 704a, 704b, and 704c. Still further pressure increases may further change the areas of contact between the contact dome 708 and the various contact pads 704a, 704b, and 704c, causing changes in the electrical conductivity properties associated with these contact pads 704a, 704b, and 704c. In this manner, a pushbutton type switch may be converted to a resistor system for measuring force and/or another force sensing or measuring system.

Of course, many variations in the structure of a force sensing system like that illustrated in FIG. 7 may be made without departing from this invention. For example, any number of contact pads, in a wide variety of various different positions, may be provided without departing from this invention. Also, various different structural materials may be used for different parts of the system 700 without departing from the invention. As still another example, if desired, the connecting structure 714 and/or contacting dome 708 may be omitted such that the plunger 712 directly engages the contact dome 708 and/or the film material 710b and/or the contact pad 704b without departing from this invention.

As still another example, if desired, at least the ends and other suitable portions of the contact dome 708 may include a material suitable for directly contacting the pattern(s) of electrically conductive material on the contact pads 704a, 70b, and 704c to thereby change the electrical conductivity properties associated with these patterns without the use of film materials 710a, 710b, and 710c. As yet additional examples, multiple layers of film material 710a, 710b, and/or 710c or an otherwise compressible electrically conductive material may be provided adjacent one or more of the contact pads 704a, 704b, and 704c such that the materials compress under pressure to thereby change the measured electrical conductivity properties as described above in conjunction with FIGS. 3A and 3B. Many other structural modifications also may be made without departing from this invention.

Figure 8:
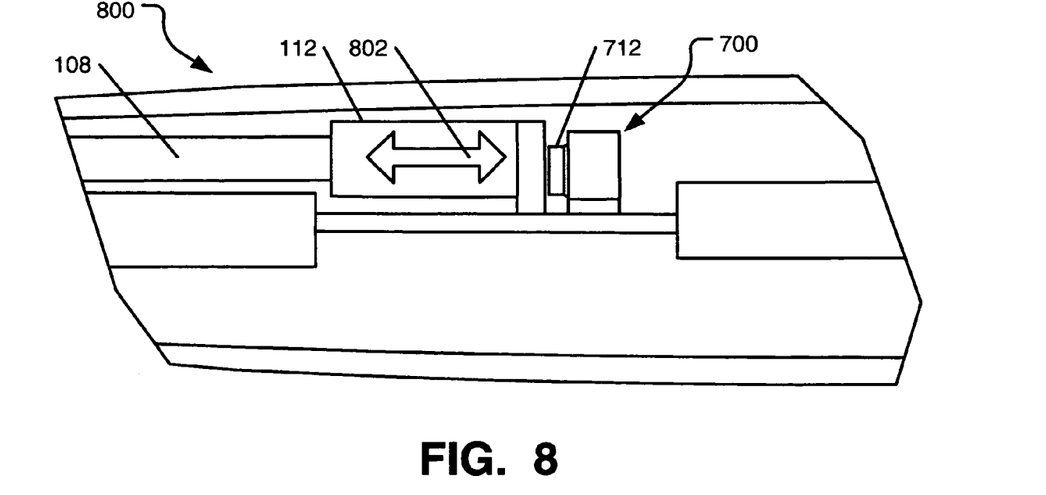
FIG. 8 illustrates an example electronic or digital pen or stylus with a pushbutton switch like that illustrated in FIG. 7 provided as part of the force measuring system.

FIG. 8 illustrates an example electronic pen system 800 in which the force sensing system 700 of FIG. 7 may be used. Specifically, in this example system 800, a pushbutton type force sensing system 700 is arranged to detect the force with which a writing surface contacting member 108 (directly or indirectly) contacts a writing surface. Force or pressure exerted on the writing surface contacting member 108 translates into movement of the contacting member 108 and its associated ink reservoir or plunger element 112 (if any, as illustrated by arrow 802), which in turn depresses the plunger 712 of the force sensing system 700 by a varying amount (depending on the writing force). The writing force and changes in the writing force may be measured in the manner described above in conjunction with FIG. 7. The analog "pushbutton" type force sensing system 700 may be attached to the substrate (e.g., a PCB) using soldering methods or by other means familiar to those skilled in the art.

Figure 9:
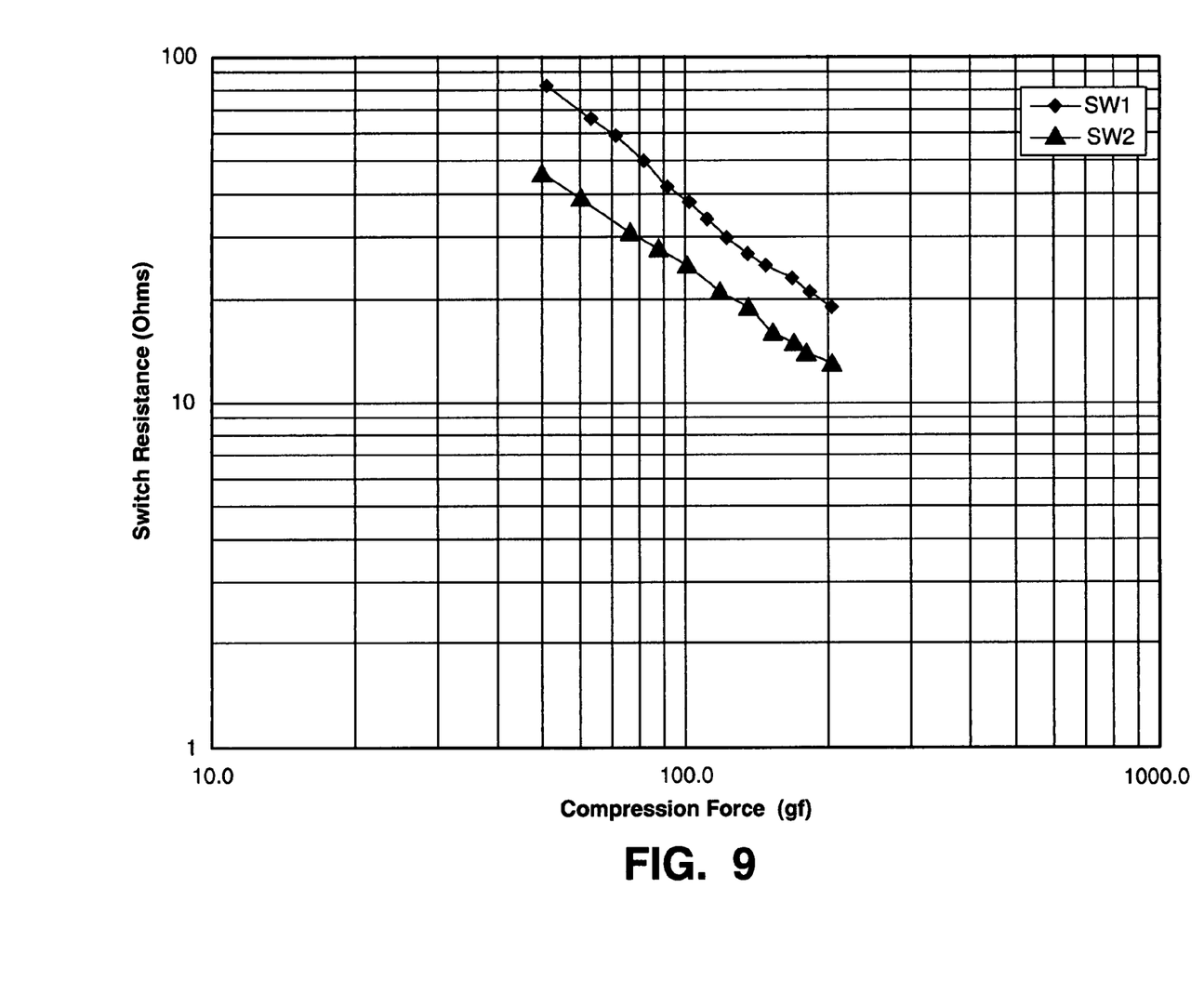
FIG. 9 is a graph illustrating the force sensitivity of various example switches in accordance with this invention.

FIG. 9 includes a graphical representation of changes in measured electrical resistivity (in ohms) associated with pattern(s) of electrically conductive material as a function of compression force (in gf) in a force sensing system, e.g., of the types described above and illustrated in conjunction with FIG. 8. In SW1, the contact pads 704a, 704b, and 704c of the force sensing system 700 included two layers of thin film conductive material 710a, 710b, and 710c, respectively (i.e., carbon impregnated polyethylene film material of the type used in anti-static bags available from Extra Packaging Corp. of Boca Raton, Fla., in this example structure), and in SW2, the contact pads 704a, 704b, and 704c included one layer of the thin film conductive material. As shown, on this log-log graph, the measured switch resistance is essentially a linear function of the compression force in both example force sensing structures. The resistance associated with the patterns of electrically conductive material decreases as the compression force increases (as shown by the downward, left-to-right sloping lines), and the presence of more film material (SW1) resulted in an increased resistance. As evident from this graph, the measured electrical conductivity property (i.e., the resistance, in this example) can be closely and reliably correlated to the compression force.

While various aspects of the invention have been described above largely in conjunction with their potential use in electronic or digital pens and/or styli, those skilled in the art will recognize that various aspects of this invention may be extended to a wide variety of other devices, systems, and environments without departing from this invention. For example, aspects of this invention may be applied in any desired systems and/or situations in which force is measured or force measurements are desired, both in systems and situations in which the force is incident on the force measuring system in its original direction (e.g., see FIGS. 6, 7, and 8 above) and systems and situations in which the force direction or location is changed from its original incident direction or location (e.g., see FIGS. 1A-1C, 4, and 5, above). As even more specific examples, in addition to electronic pens or styli, aspects of this invention may be applied to computer mouse elements to enable various game functions, variable speed scrolling functions, continuous scrolling functions, various selection features (e.g., for copying, cutting, and pasting); to Pirelli modules; to computer keyboard keys or other pushbutton type elements; gaming devices; cameras; headsets; etc.

IV. CONCLUSION

Various examples of the present invention have been described above, and it will be understood by those of ordinary skill that the present invention includes within its scope all combinations and subcombinations of these examples. Additionally, those skilled in the art will recognize that the above examples simply exemplify various aspects of the invention. The various specific steps and/or structural elements described above can be changed, functions or structural elements may be added, deleted, combined, and/or changed in position or order without departing from the invention. Thus, various changes and modifications may be made without departing from the spirit and scope of the invention, as defined in the appended claims.

The invention claimed is
1. A digital pen, comprising:
   a body member having a longitudinal direction;
   a writing force sensor including a substrate arranged at least partially within the body member, wherein the substrate includes at least one pattern of electrically conductive material on a first major surface thereof, wherein the first major surface extends in substantially the longitudinal direction;
   a writing surface contacting member mounted at least partially within the body member;
   means for changing a direction or location of application of a force transmitted via the writing surface contacting member in response to contact with a writing surface from a force applied in a first direction or location to a force delivered in a second direction, or location; and
   means for changing an electrical conductivity property associated with the pattern of electrically conductive material on the substrate based on the force with which the writing surface contacting member contacts the writing surface, wherein the means for changing the electrical conductivity property is responsive to the force delivered in the second direction or location.

2. A digital pen according to claim 1, wherein the means for changing the direction or location includes: (a) a housing having a first inlet opening and a first outlet opening, wherein the housing defines a chamber, and wherein the first outlet opening is arranged adjacent to the pattern of electrically conductive material, and (b) an incompressible or substantially incompressible material included within the chamber, wherein the force applied in the first direction or location is transmitted to the incompressible or substantially incompressible material within the chamber through the chamber inlet opening, through the incompressible or substantially incompressible material, and to the chamber outlet opening as the force delivered in the second direction or location.

3. A digital pen according to claim 2, wherein the means for changing the electrical conductivity property associated with the pattern of electrically conductive material includes an electrically conductive film material arranged adjacent the pattern of electrically conductive material and the first outlet opening.

4. A digital pen according to claim 3, wherein the means for changing the electrical conductivity property associated with the pattern of electrically conductive material changes the electrically conductive property based on an area of the electrically conductive film material that contacts the pattern of electrically conductive material when the force in the second direction or location is applied to the electrically conductive film material through the means for changing the direction or location.

5. A digital pen according to claim 1, wherein the means for changing the electrical conductivity property associated with the pattern of electrically conductive material includes a film material arranged adjacent the pattern of electrically conductive material.

6. A digital pen according to claim 5, wherein the means for changing the electrical conductivity property associated with the pattern of electrically conductive material changes the electrically conductive property based on an area of the film material that contacts the pattern of electrically conductive material when the force in the second direction. or location is applied to the film material.

7. A digital pen according to claim 5, wherein the film material includes a polyethylene material coated or impregnated with an electrically conductive material.

8. A digital pen according to claim 1, wherein the means for changing the direction or location includes a chamber having a first inlet opening that allows access to the chamber via the longitudinal direction and a first outlet opening facing a direction other than the longitudinal direction.

9. A digital pen according to claim 8, wherein the means for changing the direction or location includes an incompressible or substantially incompressible material included within the chamber.

10. A digital pen according to claim 9, wherein the means for changing the direction or location includes a wall element arranged at an angle with respect to the longitudinal direction, wherein the incompressible or substantially incompressible material contacts the wall element to thereby, at least in part, change the direction or location of application of the force.

11. A digital pen according to claim 1, wherein the means for changing the direction or location includes a spring member arranged between the writing surface contacting member and a retaining member, wherein the spring member expands or buckles in a direction or location other than the longitudinal direction to thereby deliver the force in the second direction or location.

12. A digital pen according to claim 11, wherein the means for changing the electrical conductivity property associated with the pattern of electrically conductive material includes an electrically conductive film material arranged adjacent the pattern of electrically conductive material and a portion of the spring member, wherein the electrically conductive property changes based on an area of the electrically conductive film material that contacts the pattern of electrically conductive material when the force is delivered in the second direction or location.

13. A force measuring system, comprising:
a body member having a chamber defined therein, wherein the chamber includes a first inlet opening and a first outlet opening, wherein the first inlet opening is located physically away from and, optionally, facing in a different direction from the first outlet opening;
a pattern of electrically conductive material arranged adjacent to the first outlet opening;
an incompressible or substantially incompressible material included within the chamber, wherein the incompressible or substantially incompressible material changes a direction or location of an applied force from a force applied in a first direction or location passing through the first inlet opening to a force delivered in a second direction or location passing through the first outlet opening;
means for applying a force to the incompressible or substantially incompressible material in the chamber via the first. inlet opening; and
a film material arranged adjacent the first outlet opening and the pattern of electrically conductive material, wherein a force corresponding to the force applied in the first direction or location is applied to the pattern of electrically conductive material through the film material and the first outlet opening.

14. A force measuring system according to claim 13, wherein the film material changes an electrical conductivity property associated with the pattern of electrically conductive material based on an area of the film material that contacts the pattern of electrically conductive material when the force is applied to the film material through the first outlet opening.

15. A force measuring system according to claim 13, wherein the film material includes a polyethylene material coated or impregnated with an electrically conductive material.

16. A force measuring system according to claim 13, wherein a wall element is arranged in the chamber, and wherein the incompressible or substantially incompressible material contacts the wall element to thereby, at least in part, change the direction or location of the applied force from the first direction or location to the second direction or location.

17. A method, comprising:
contacting a writing surface contacting member of a digital pen to a surface and thereby applying a writing force to the writing surface contacting member, wherein the writing, force has a major component in a longitudinal direction of the digital pen;
using a mechanism in the digital pen to translate the writing force such that the translated writing force has a major component in a direction other than the longitudinal direction, the direction of the major component of the translated force being incident to a pattern of electrically conductive material in the digital pen; and
measurably changing an electrical conductivity property associated with the pattern of electrically conductive material in proportion to a change in the major component of the translated force incident to the pattern, wherein the pattern of electrically conductive, material extends substantially in the longitudinal direction, and wherein the measurable change in the electrical conductivity property is proportional to the change in the major component of the writing force; and
measuring the writing force based on a measurement of the change in the electrical conductivity property.

18. A method according to claim 17, wherein the direction or location of application of the writing force is translated by applying the writing force to an incompressible or substantially incompressible material provided in a chamber, wherein the chamber has an inlet opening allowing application of the writing force to the incompressible or substantially incompressible material and an outlet opening allowing application of the translated force outside of the chamber in the direction other than the longitudinal direction.

19. A method according to claim 17, wherein the electrical conductivity property associated with the pattern of electrically conductive material is changed based on an area of a film material that contacts the pattern, wherein the area of the film material that contacts the pattern depends on the force component applied to the film material in the direction other than the longitudinal direction.

20. A method according to claim 19, wherein the film material includes a polyethylene material coated or impregnated with an electrically conductive material.

* * * * *

UNITED STATES PATENT AND TRADEMARK OFFICE
CERTIFICATE OF CORRECTION

| | | |
|---|---|---|
| PATENT NO. | : 7,454,977 B2 | Page 1 of 1 |
| APPLICATION NO. | : 11/057371 | |
| DATED | : November 25, 2008 | |
| INVENTOR(S) | : Glen C. Larsen et al. | |

It is certified that error appears in the above-identified patent and that said Letters Patent is hereby corrected as shown below:

In column 19, line 56, in Claim 1, delete "direction," and insert -- direction --, therefor.

In column 20, line 35, in Claim 6, delete "direction." and insert -- direction --, therefor.

In column 21, line 23, in Claim 13, delete "first." and insert -- first --, therefor.

In column 22, line 5, in Claim 17, delete "writing," and insert -- writing --, therefor.

In column 22, line 17, in Claim 17, delete "conductive," and insert -- conductive --, therefor.

Signed and Sealed this
Third Day of May, 2011

David J. Kappos
*Director of the United States Patent and Trademark Office*